Aug. 12, 1930.  E. B. TOLMAN, JR  1,772,881
CONVEYER
Filed Jan. 30, 1929
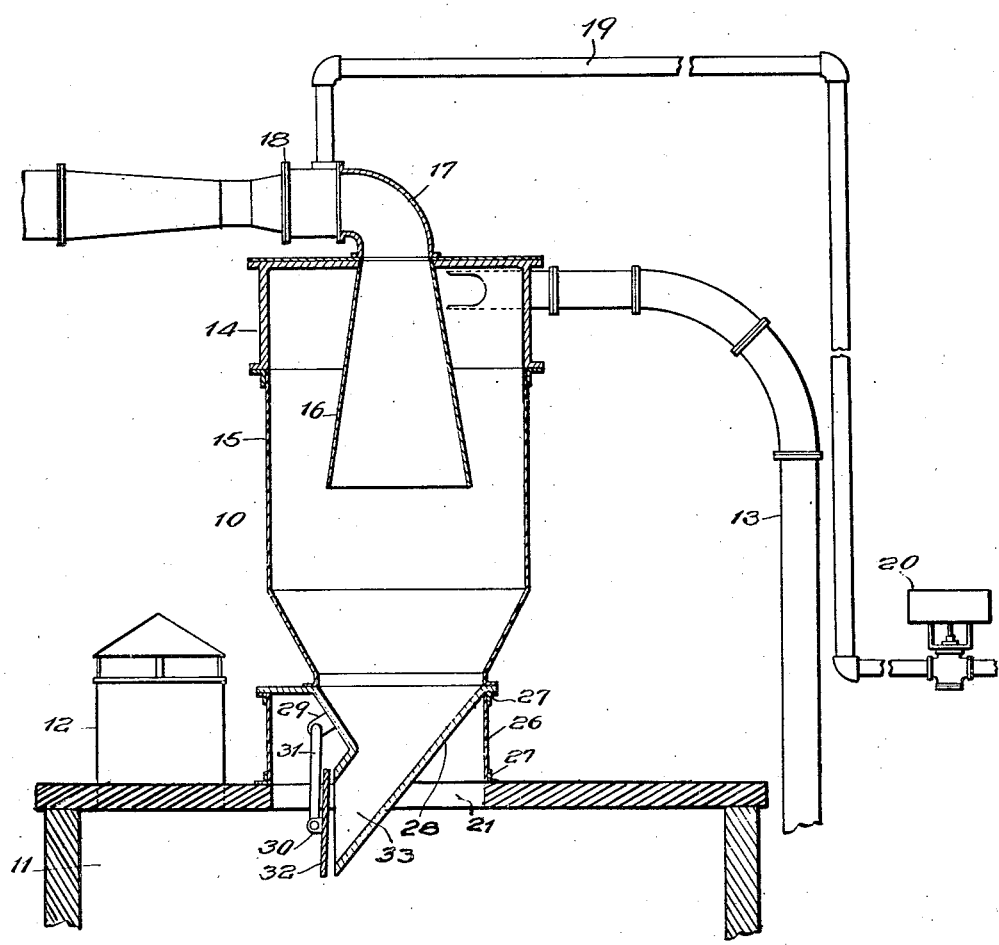
Witness:
William P. Nilroy
Inventor:
Edgar B. Tolman Jr.
By Hill, Hill
Attys Patented Aug. 12, 1930

1,772,881

UNITED STATES PATENT OFFICE

EDGAR B. TOLMAN, JR., OF CHICAGO, ILLINOIS

CONVEYER

Application filed January 30, 1929. Serial No. 336,083.

The invention relates to pneumatic conveyers and more particularly it relates to means for controlling the discharge of material from such conveyers into storage tanks or the like and one object of the invention is the production of improved means for controlling the discharge of material from the conveyer following the separation of the material from the conveying fluid.

Exhausters or air pumps are the customary means provided for maintaining sub-atmospheric pressure in such conveyers and as generally constructed the discharge gate of such conveyers is opened by the weight of the contained material, the exhauster or air pump meanwhile continuing active regardless of whether the discharge gate is closed or is in open position to permit the discharge of material.

The device of my invention includes a discharge gate of the swing type, by which is meant, a gate, operable by gravity to swing from open to closed position or to swing from closed to open position. As heretofore used in connection with pneumatic conveyers such gates have been so swung or mounted that their weight normally causes them to hang closed and to be opened when the pressure of the material on the gate is greater than the atmospheric pressure, the exhauster or pump being operated continuously so that the gate during a period of operation is opened only by the pressure of the contained material against the gate and closes again before the material is all discharged. Such closing occurs when the atmospheric pressure exceeds the thrust of the material remaining undischarged. Under such conditions the gate necessarily closes against the flow of material and if the material is finely comminuted, no particular difficulty is experienced in moving the gate to a substantially fluid tight closed position. However, where the conveyed material is coarse or lumpy, as, for example ashes containing small clinkers or other hard material, such lumps or clinkers are frequently lodged and held between the closing gate and the end of the outlet and as a result, the device does not operate satisfactorily. In my invention, the gate always closes after the receiving chamber is completely empty and therefore cannot be held open by such lumps or large particles.

The invention provides for operating the exhauster or pump intermittently and not continuously and also provides for a gate so mounted that its weight keeps it open except when the exhauster or pump is active. The initial operation of the exhauster starts an inwardly travelling current of air through the discharge outlet. The air current swings the gate to closed position. When the gate is closed operation of the exhauster lowers the pressure in the receiving chamber to the point necessary to effectively move material. The gate is held in closed position entirely by atmospheric pressure and swings open by its own weight only when the exhauster or pump becomes inactive. A timer is provided for regulating the periods of operation and cessation of operation of the exhauster or pump. Such periods are predetermined as to length and frequency to cause the conveyer to become inactive and the gate to open before the weight of the accumulated material becomes sufficient to force the gate open against the atmospheric pressure. The gate remains open a sufficient length of time, before the exhauster or pump again starts operation, to permit the receiving chamber to be completely emptied of accumulated material. Since the gate never closes until the receiving chamber is emptied, a feature of the invention is the elimination of any possibility that it will close on cinders or other chunks of material and thereby adapts the device for the satisfactory discharge of materials such as ashes containing cinders as well as other material of irregular degrees of fineness or coarseness.

Another object of the invention is the provision of a discharge gate for a conveyer of the class described which is so mounted as to normally remain open except when the conveyer is in operation and held in closed position by atmospheric pressure during the entire period of operation of the conveyer.

A still further object of the invention is to provide an improved conveyer construction wherein the conveyer is intermittently active and inactive for predetermined intervals in combination with a discharge gate which hangs open by gravity when the conveyer is inactive and which closes only when the conveying mechanism becomes active and wherein the period of active operation is so short that the weight of the material accumulated is never sufficient to open the gate against atmospheric pressure and wherein the inactive period continues long enough to permit the complete discharge of all material contained in the receiving chamber before resumption of operation and the resultant closing of the gate.

In the drawing, wherein like reference characters indicate like or corresponding parts: there is shown an elevational and partial section view through a conveyer embodying the device of my invention.

Referring now to the drawing, the numeral 10 generally designates a conveyer operable to move material such as ashes, shavings and the like from a distance and to discharge the same into a storage bin 11 with which the conveyer is connected. The storage bin 11 is provided with a vent 12. A conveying pipe 13 connects a receiving chamber 14 with a supply of the material to be conveyed. The pipe 13 opens directly into the receiving chamber 14, the walls and top portion of which are preferably of hard metal to withstand the abrasion due to the impact of the discharged material. A separating chamber 15 is positioned immediately below the receiving chamber 14 and tapers inwardly at its bottom end portion to form a frustum of a cone.

An exhaust pipe 16 connects the separating chamber 15 with an exhauster 18 through an L 17. The exhauster 18 is of the usual Venturi tube construction into which a pressure fluid supply line 19 discharges its contents through nozzles (not shown). An operating timer 20 is suitably connected with the supply line 19 to intermittently open and close the line to the flow of fluid.

Material is discharged from the separating chamber 15 into the storage bin 11 through an opening 21 in the roof of the bin. A frame 26 supports the separating chamber 15 and encloses the roof opening 21. Angles 27 connect the frame 26 to the bottom portion of the separating chamber 15 and to the roof of the storage bin 11.

A downwardly extending discharge member 28 rests upon the frame 26 and provides a direct support for the chamber 15. The discharge member 28 extends downwardly and to one side, as shown, forming an inclined chute or outlet 33 having its lower end terminating in a substantially vertical plane.

A lug 29 on the exterior of the discharge member 28 provides a support from which a closure member or gate 32 is suspended by a link 31. The link 31 is pivotally connected at its upper end to the lug 29 and at its lower end to a lug 30 formed on the gate or closure member 32. The link 31 and the closure member 32 acts similarly to a pendulum. The lug 29 is so positioned that the weight of the suspended gate 32 normally maintains the gate in open position and spaced slightly away from the end of the outlet member 33. The lug 30 is preferably positioned slightly above the center of gravity of the gate 32 and thereby causes the gate to take and maintain a substantially vertical position when open. The gate 32 operates as a valve which is fluid controlled in closing and while it remains closed and is gravity controlled in its movement to and retention in open position.

In operation the initial action of the exhauster 18 starts a current of air moving inwardly through the inclined outlet 33. The gate 32 and its suspended parts are actuated by such induced air currents to swing to the right as observed in the drawing and to bring the gate into contact with the lower vertically extending boundary end of the outlet member 33. The conduit 33 is thereby closed to further flow of air therethrough. The gate 32 is held in this closed position by atmospheric pressure during the operation of the exhauster 18. As the operation of the exhauster 18 continues, the pressure in the receiving chamber 15 is lowered sufficiently to cause material to be carried through the pipe 13 and discharged into the receiving chamber 14. The discharged material falls by gravity and is deposited in the outlet member 33 and the discharge member 28. The working pressure in the receiving chamber 14 and the separating chamber 15 during the operation of the exhauster 18 is sufficiently below atmospheric pressure that the gate 32 is held in closed position against the thrust occasioned by the weight of the material deposited in the member 28.

The timer 20, or any other device suitably operable to control the line 19, is arranged to close the line after a predetermined period of operation and thereby stops the exhauster 18. The period of operation is made sufficiently short that only a limited amount of material accumulates, this amount being insufficient in weight to force the gate 32 to open when the exhauster is operating. Upon stopping the exhauster 18 the pressure in the chambers 14 and 15 becomes atmospheric, the gate 32 is then swung outwardly in pendulum like fashion by its own weight and by the thrust of the material contained in the members 28 and 33, thereby permitting all of the material to be discharged into the storage bin 11. The pendulum like mounting of the gate 32 permits the gate to swing out of the path of the discharged material and to return to its normal suspended position adjacent to the end of the conduit 33 as soon as the material is discharged. The timer 20 then again starts the exhauster 18 by opening the line 19 but only after a predetermined period of inactivity of sufficient duration to permit the accumulated material to be discharged through the conduit 33.

Thus it will be seen, that I have provided a discharge gate or valve mechanism and apparatus of the kind described, which is operable by fluid pressure to be moved to and retained in closed position and is gravity operated in moving to and being retained in open position.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a device of the kind described, a chamber having a discharge outlet, a closure member, a link from which said closure member is pivotally suspended adjacent to and spaced apart from the discharge end of the outlet and exhauster means operable to convey material to said chamber, the initial operation of said means actuating the closure member to close said outlet.

2. In a device of the kind described, a chamber having a discharge outlet, a closure member, a link from which said closure member is pivotally suspended adjacent to and spaced apart from the discharge end of the outlet, exhauster means operable to convey material to said chamber, the initial operation of said means actuating the closure member to close said outlet and the continued operation of said means retaining said member in closed position.

3. In a device of the kind described, a chamber having a discharge outlet, a closure member, a link form which said closure member is suspended in pendulum fashion adjacent the discharge end of the outlet and means intermittently operable to create sub-atmospheric pressure in said chamber, the initial operation of said means creating air currents actuating said closure member to its closed position.

4. In a device of the kind described, a chamber having a discharge outlet, a closure member swingably mounted adjacent the discharge end of the outlet and means intermittently operable to create sub-atmospheric pressure in said chamber, the initial operation of said means creating air currents actuating said closure member to closed position, said closure member being held in closed position solely by the continued operation of said means.

5. In a device of the kind described a chamber having a discharge outlet, a closure member swingably mounted adjacent the discharge end of the conduit, a conveying conduit discharging into said chamber and means intermittently operable to create sub-atmospheric pressure in said chamber and conveying conduit, the initial operation of said means creating a suction at the end of the discharge outlet operable to move the closure member to its closed position, said closure member remaining closed while said means is in operation and swinging open by its own weight when said means ceases operation.

In witness whereof, I hereunto subscribe my name this 25th day of January, A. D. 1929.

EDGAR B. TOLMAN, Jr.